United States Patent Office 3,478,057
Patented Nov. 11, 1969

3,478,057
THIOPHENE-SULPHONYL-PHOSPHOROTHIOATES
Asbjorn Baklien, Kingsbury, Victoria, Jocelyn M. Gregory, Croydon, Victoria, and Klaus Kling, Ascot Vale, Victoria, Australia, assignors to Imperial Chemical Industries of Australia and New Zealand Limited, Melbourne, Victoria, Australia, a company
No Drawing. Filed Sept. 2, 1966, Ser. No. 576,812
Claims priority, application Australia, Sept. 22, 1965, 64,365/65
Int. Cl. C07f 9/16, 9/40; A01n 9/36
U.S. Cl. 260—329       5 Claims

ABSTRACT OF THE DISCLOSURE

There are provided organic phosphorous compounds which are useful as insecticides and which have the formula:

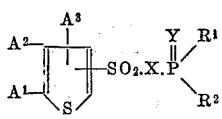

wherein:
X is 0 or S
Y is 0 or S
$R^1$ is $OR^3$, $SR^3$, alkyl 1–4 C, chloromethyl or phenyl;
$R^2$ is $OR^3$ or $SR^3$;
$R^3$ is alkyl 1–4 C;
$A^1$ is hydrogen, alkyl 1–8 C, alkenyl 2–3 C, chlorine, bromine, nitro, lower acyl 2–4 C, acyloxy 2–4 C, $SO_2NR^4R^5$ or $SO_2OR^6$;
$A^2$ is hydrogen, chlorine, bromine, nitro or methyl;
$A^3$ is hydrogen, chlorine, bromine or methyl;
$R^4$ is hydrogen or methyl;
$R^5$ is hydrogen, methyl or ethyl; and
$R^6$ is alkyl 1–3 C and wherein the abbreviations 1–3 C, 1–4 C, 1–8 C, 2–3 C or 2–4 C means that said radical has 1 to 3 inclusive, 1 to 4 inclusive, 1 to 8 inclusive, 2 to 3 inclusive or 2 to 4 inclusive carbon atoms respectively and where acyl stands for a carboxylic acid residue. Representative of compounds of the formulae are O,O-diethyl S-(5-nitrothiophene-2-sulphonyl)phosphorodithioate; O,O-diethyl S-(4-nitrothiophene-2-sulphonyl)phosphorodithioate; O,O-diethyl S-(5-chlorothiophene - 2 - sulphonyl)phosphorodithioate; O,O-diethyl S-(4-bromothiophene-2-sulphonyl) phosphorodithioate; and O,O-diethyl S-(5-bromothiophene-2-sulphonyl)phosphorodithioate.

---

This invention relates to new and useful organic phosphorus compounds; in particular it relates to phosphorus compounds which have useful biological, especially pesticidal properties and to processes for the production thereof.

Accordingly the present invention provides new organic phosphorous compounds of the formula:

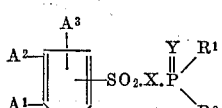

where:
X is 0 or S;
Y is 0 or S;
$R^1$ is $OR^3$, $SR^3$, alkyl 1–4 C, chloromethyl or phenyl;
$R^2$ is $OR^3$ or $SR^3$;
$R^3$ is alkyl 1–4 C;

and wherein $A^1$, $A^2$ and $A^3$, which may be the same or different, are D, E or G, where D is hydrogen, halogen, alkyl 1–10 C or alkenyl 1–10 C;
   E is nitro, acyl 1–10 C, $-SO_2NR^4R^5$ or $-SO_2OR^6$;
   G is $-COOR^4$ provided that no more than two of said substituents $A^1$, $A^2$ and $A^3$ have the meaning E, no more than one of said substituents $A^1$, $A^2$ and $A^3$ stands for G and no more than one of said substituents $A^1$, $A^2$ and $A^3$ stands for E whenever another one stands for G and wherein furthermore $R^4$ is hydrogen or alkyl 1–4 C;
$R^5$ is hydrogen or alkyl 1–4 C;
$R^6$ is alkyl, aryl or alkaryl.

Preferred compounds are those where E is E' and E' is nitro or acyl 1–10 C. Most preferred compounds are those where D is D' and D' is hydrogen, halogen, methyl, ethyl, propyl, isopropyl, butyl or isobutyl and E is E" and E" is nitro, and wherein the abbreviation 1–4 C or 1–10 C means bearing 1 to 4 inclusive or 1 to 10 inclusive carbon atoms respectively in the radical.

As indicated in the formula the substituents $A^3$ and

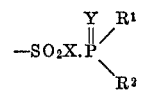

may be in the 2- or 3-positions.

Typical compounds according to the invention are e.g. O,O-diethyl S-(thiophene - 2 - sulphonyl) phosphorodithioate

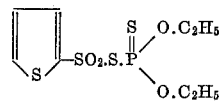

and the following compounds in which the abbreviations PDT and T-2-S stand for phosphorodithioate and thiophene-2-sulphonyl respectively and Et, Me, isoPr, Allyl and Bu stand for ethyl, methyl, isopropyl, allyl and butyl radicals respectively.

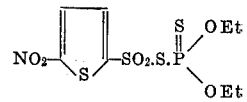

O,O-diethyl S-(5-nitroT-2-S) PDT

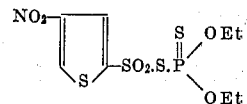

O,O-diethyl S-(4-nitroT-2-S) PDT

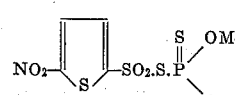

O,O-dimethyl S-(5-nitroT-2-S) PDT

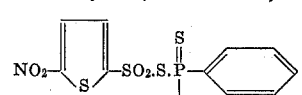

O-ethyl S-(5-nitroT-2-S) benzenephosphonodithioate

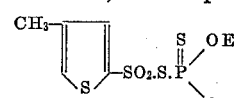

O,O-diethyl S-(4-methylT-2-S) PDT

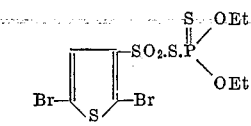

O,O-diethyl S-(2,5-dibromothiophene-3-sulphonyl) PDT

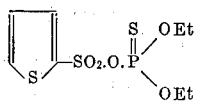

O,O-diethyl O-(T-2-S) phosphorothioate

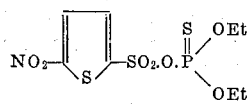

O,O-diethyl O-(5-nitro-T-2-S) phosphorothioate

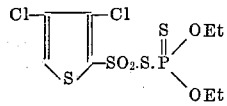

O,O-diethyl O-(5-nitroT-2-S) phosphorothioate

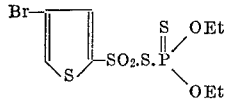

O,O-diethyl S-(4-bromoT-2-S) PDT

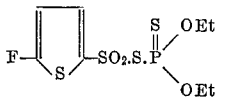

O,O-diethyl S(5-fluoroT-2-S) PDT

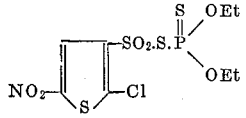

O,O-diethyl S-(2-chloro-5-nitrothiophene-3-sulphonyl) PDT

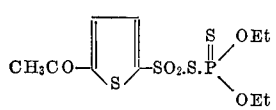

O,O-diethyl S-(5-acetylT-2-S) PDT

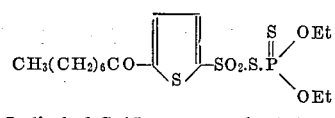

O,O-diethyl S-(5-n-octanoylT-2-S) PDT

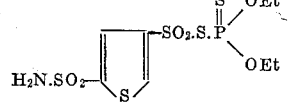

O,O-diethyl S-(5-sulphamoyl-thiophene-3-sulphonyl) PDT

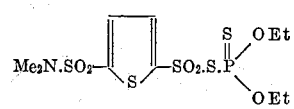

O,O-diethyl S-(5-dimethylsulphamoylT-2-S) PDT

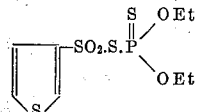

O,O-diethyl S-(thiophene-3-sulphonyl) PDT

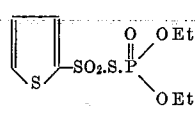

O,O-diethyl S-(T-2-S) phosphorothioate

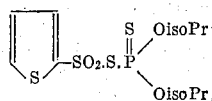

O,O-diisopropyl S-(T-2-S) PDT

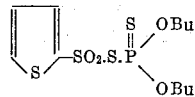

O,O-dibutyl S-(T-2-S) PDT

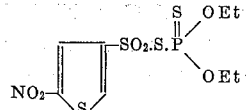

O,O-diethyl S-(5-nitrothiophene-3-sulphonyl) PDT

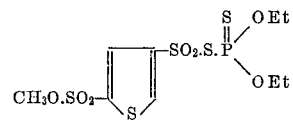

O,O-diethyl S-(5-methoxysulphonylthiophene-3-sulphonyl) PDT

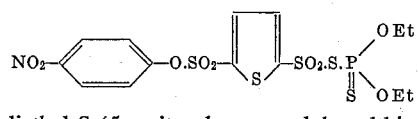

O,O-diethyl S-(5-p-nitrophenoxy-sulphonylthiophene-2-sulphonyl) PDT

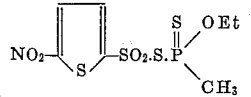

O-ethyl S-(5-nitroT-2-S) methanephosphonodithioate

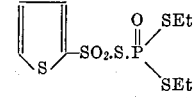

S,S-diethyl S-(T-2-S) phosphorotrithioate

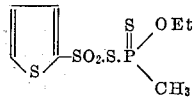

O-ethyl S-(T-2-S) methanephosphonodithioate

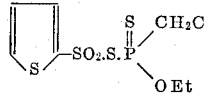

O-ethyl S-(T-2-S) chloromethanephosphonodithioate

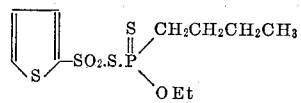

O-ethyl S-(T-2-S) butanephosphonodithioate

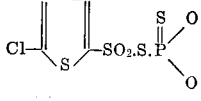

O,O-diethyl S-(5-chloroT-2-S) PDT

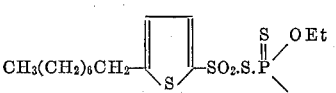

O,O-diethyl S-(5-n-octylT-2-S) PDT

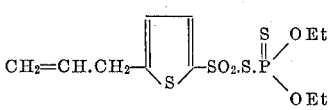

O,O-diethyl S-(5-allylT-2-S) PDT

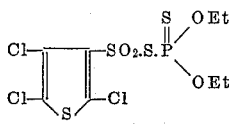

O,O-diethyl S-(2-4,5-trichlorothiophene-3-sulphonyl) PDT

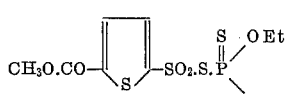

O,O-diethyl S-(5-methoxycarbonylT-2-S) PDT

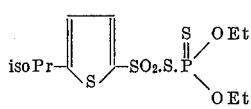

O,O-diethyl S-(5-isopropylT-2-S) PDT

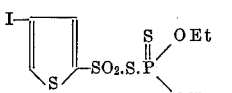

O,O-diethyl S-(4-iodoT-2-S) PDT

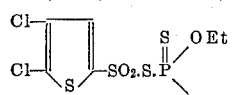

O,O-diethyl S-(4,5-dichloroT-2-S) PDT

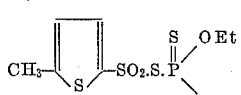

O,O-diethyl S-(5-methylT-2-S) PDT

Compounds of this invention have useful biological properties; thus compounds of the formula:

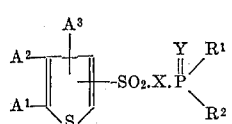

wherein $A^1$, $A^2$, $A^3$, X, Y, $R^1$ and $R^2$ are as above defined, have shown high contact and residual activity against various species of insects, mites and fungi e.g. *Musca domestica* (house-fly), *Lucilia cuprina* (sheep blow-fly), *Calandra granaria* (grain weevil), *Plutella maculipennis* (cabbage moth) larvae, *Tetranychus telarius* (red spider) adults, *Aphis fabae* (broad bean aphis), *Boophilus microplus* (cattle tick) adults, larvae and intermediate stages, *Sclerotinia fructicola* (brown rot fungus), *Alternaria solani* (tomato blight) and *Botrytis allii* (onion blight).

A particular advantage of many of the compounds is that they have low toxicity to mammals; thus the media lethal oral dose to mice for most of the compounds is in the range of 50 to 250 mg./kg. of bodyweight. Further- more we have found that numerous plants e.g. pea, mustard, convolvulus, sunflower, lantana, dwarf bean, tobacco, tomato and cabbage are not adversely affected by certain compounds of this invention at the concentrations required to control insects and fungi; such compounds are e.g. O,O-diethyl-S-(thiophene-2-sulphonyl) phosphorodithioate and O,O-diethyl S-(5-nitrothiophene-2-sulphonyl) phosphorodithioate; in general the compounds of this invention have low phytotoxicity. The compounds of this invention may be applied in the usual manner directly to the plants or to the soil in which they are growing in admixture with carriers or diluents and, if desired, there may additionally be used auxiliary agents and/or plant nutrients.

Accordingly we also provide a new composition of matter comprising firstly, as the active ingredient, at least one compound of the general formula:

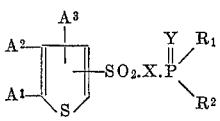

wherein $A^1$, $A^2$, $A^3$, X, Y, $R^1$ and $R^2$ are as above defined and secondly an inert carrier. By inert carrier we mean either a liquid or a solid diluent used to obtain the desired concentration and to facilitate handling. For most purposes liquid formulations to be used in sprays are most convenient and among these again aqueous liquid formulations are preferred. Emulsifiable solutions of the active compounds are prepared by dissolving them in a solvent which is non-toxic to the plants or animals to which the liquid is to be applied e.g. for use on many plants in xylene, toluene, kerosene or methylated naphthalenes, adding an emulsifier and/or wetting agent and, optionally, adding some water. A typical emulsifiable concentrate composition of this type would comprise 20% of O,O-diethyl S-(thiophene-2-sulphonyl) phosphorodithioate, 40% kerosene, 35% xylene and 5% of an alkyl aryl polyether alcohol emulsifier, all quantities being expressed on a weight basis.

Alternatively our mixtures may also be formulated into dusts by combining them with solid inert carriers such as powdered chalk, talcs, kieselguhr, bentonite and other colloidal clays.

They may also be formulated as dispersible powders by milling the active ingredient to a fine powder, optionally together with an inert solid carrier as above disclosed and adding furthermore a dispersing agent. The preferred dispersible powders comprise the active ingredient, finely ground with a colloidal clay together with a dispersing agent. Suitable emulsifying and dispersing agents are known from the prior art; anionic, cationic and non-ionic agents may be used. A suitable non-ionic emulsifier is for example the condensation product of nonylphenol with ethylene oxide available commercially under the trademark Lissapol N; suitable dispersing agents are for example the disodium salt of dinaphthylmethane disulphonate, sodium lauryl sulphonate and the condensation product of alkylphenol with ethylene oxide available commercially under the trademark Lubro E.

We also provide a process of manufacture of the compounds of this invention of the formula:

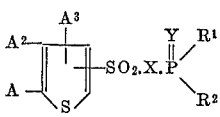

(Generic formula I)

wherein $A^1$, $A^2$, $A^3$, X, Y, $R^1$ and $R^2$ are as above defined, which process comprises reacting a thiophenesulphonyl halide with a salt of a phosphoric or phosphonic acid or their analogues according to the equation

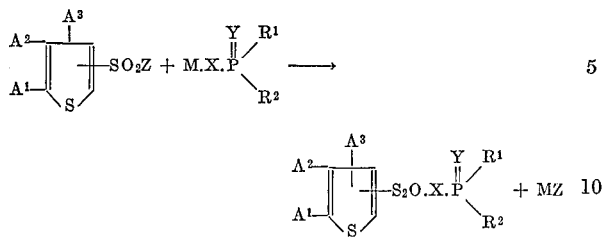

wherein Z representse halogen, preferably chlorine and M represents a monovalent metal ion or ammonium, and is preferably sodium, potassium or ammonium. The reaction is preferably carried out in a suitable inert solvent for example acetone, chloroform, ethylene chloride, methylene chloride, ether, benzene, carbon tetrachloride, acetonitrile, dioxan, ethyl methyl ketone, dimethyl formamide, sulpholane, etc. at temperatures ranging from −20° C. to the reflux temperature of the solvent, preferably between 0° C. and 100° C.

We also provide a process of manufacture of compounds of this invention of the formula:

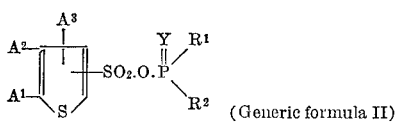 (Generic formula II)

wherein $A^1$, $A^2$, $A^3$, Y, $R^1$ and $R^2$ are as above defined, which comprises reacting a thiophenesulphonic acid salt with a phosphorus halide according to the equation

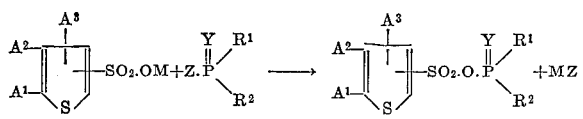

wherein Z represents halogen preferably chlorine, and M represents ammonium or a monovalent metal and is preferably sodium, potassium or ammonium. The reaction is preferably carried out in a suitable inert solvent for example acetone, chloroform, ethylene chloride, methylene chloride, ether, benzene, carbon tetrachloride, acetonitrile, dioxan, ethyl methyl ketone, dimethyl formamide, sulpholane, etc. at temperatures ranging from −20° C. to the reflux temperature of the solvent preferably between 0° C. and 100° C.

As already stated above, compounds of our invention have useful biological properties. Thus we have discovered that our compounds kill the mobile stages of *Tetranychus telarius* (red spider) for example on beans and apple and pear trees and all stages of *Boophillis microplus* (cattle tick). Accordingly we also provide a process of eradicating undesired acarina which comprises treating media including plants and animals infested with acarina with compositions according to this invention.

We have also discovered that these compounds kill the adults and eggs of *Calandra granaria* (grain weevil), *Plutella maculipennis* (cabbage moth) and *Aphis fabae* (broad bean aphids). Thus we also provide a process of eradicating undesired insects which comprises treating media infested with insects with compositions according to this invention. Infested media may be grain, plants or domestic animals. We have discovered furthermore that compounds of this invention show activity against *Alternaria solani* (tomato blight), *Sclerotinia fructicola* (brown not fungus) and *Botrytis allii* (onion blight). Accordingly we also provide a process of eradicating undesired fungi which comprises treating plants infested with fungi with compositions according to this invention.

The following examples illustrate the preparation of the compounds and compositions of our invention and their biological effects but are not to be construed as limiting.

EXAMPLE 1

O,O-diethyl S-(thiophene-2-sulphonyl) phosphorodithioate

Thiophene-2-sulphonyl chloride (9 g.) dissolved in 20 ml. acetone was added dropwise with stirring to a solution of O,O-diethyl ammonium phosphorodithioate (10.2 g.) in acetone (50 ml.). The reaction mixture was then heated under reflux for 2 hours. The ammonium chloride was filtered off and the acetone distilled off, finally under reduced pressure. The light-greenish oil thus obtained was shown by nuclear magnetic resonance, infra red spectroscopy and elemental analysis to be the desired compound.

EXAMPLE 2

O,O-diethyl S-(5-nitrothiophene-2-sulphonyl) phosphorodithioate

A solution of 5-nitrothiophene-2-sulphonyl chloride (23 g.) in acetonitrile (75 ml.) was added dropwise and with stirring to a solution of O,O-diethyl sodium phosphorodithioate (21 g.) in acetonitrile (75 ml.) maintained at about 40° C. The reaction mixture was then heated at 50–60° C. for 2 hours. The precipitated sodium chloride was filtered off and most of the acetonitrile removed by distillation. The residue was extracted with 100 ml. of methylene chloride, the solution washed with 50 ml. of water and dried over anhydrous sodium sulphate. Distillation of the methylene chloride, finally under reduced pressure left a brown oil which was shown by nuclear magnetic resonance, infra red spectroscopy and elemental analysis to be the desired compound.

EXAMPLE 3

O,O-diethyl O-(thiophene-2-sulphonyl) phosphorothioate

A solution of O,O-diethyl phosphorothionochloridate (18.8 g.) in methylene chloride (50 ml.) was added dropwise to a stirred mixture of sodium thiophene-2-sulphonate (19 g.) in acetone (100 ml.). The reaction mixture was then heated under reflux for 2 hours, cooled and filtered. The solvent was removed by distillation, finally under reduced pressure, to leave the compound as a light yellow oil. The constitution of the product was determined by nuclear magnetic resonance, infra red spectroscopy and elemental analysis.

EXAMPLE 4

By the method used in Example 1, 4-nitrothiophene-2-sulphonylchloride and O,O-diethyl ammonium phosphorodithioate were reacted to produce O,O-diethyl S-(4-nitrothiophene-2-sulphonyl) phosphorodithioate, obtained as a brown oil. The constitution of the product was determined by nuclear magnetic resonance, infra red spectroscopy and elemental analysis.

EXAMPLE 5

By the method of Example 2, 5-nitrothiophene-2-sulphonyl chloride and O-ethyl S-sodium benzenephosphonodithioate were reacted to give O-ethyl S-(5-nitrothiophene-2-sulphonyl) benzenephosphonodithioate as an almost colourless oil. The constitution of the product was determined by nuclear magnetic resonance, infra red spectroscopy and elemental analysis.

EXAMPLE 6

By the method of Example 1, thiophene-2-sulphonyl chloride and O,O-diethyl S-ammonium phosphorothioate (the latter containing a small amount of the O-ammonium isomer) were reacted to give essentially O,O-diethyl S-(thiophene-2-sulphonyl) phosphorothioate. The constitution of the product was determined by nuclear magnetic resonance, infrared spectroscopy and elemental analysis.

EXAMPLE 7

O,O-diethyl S-(2,5-dibromothiophene-3-sulphonyl) phosphorodithioate

Using the method described in Example 1, 2,5-dibromothiophen-3-sulphonyl chloride and O,O-diethyl S-ammonium phosphorodithioate were reacted. The viscous oil thus obtained was shown by nuclear magnetic resonance, infrared spectroscopy and elemental analysis to be the desired compound.

EXAMPLE 8

Diethyl thiophene-2-sulphonyl phosphorotetrathioate

Thiophene-2-sulphonyl chloride and ammonium diethyl phosphorotetrathioate were reacted as described in Example 1 to give the desired compound as a brown oil.

EXAMPLE 9

O-ethyl S-(5-nitrothiophene-2-sulphonyl) methanephosphonodithioate 5-nitrothiophene - 2 - sulphonyl chloride and S-ammonium O-ethyl methanephosphonodithioate were reacted by the method of Example 1 to give the desired compound as a light brown oil.

EXAMPLE 10

O-ethyl S-(4-nitrothiophene-2-sulphonyl) chloromethanephosphonodithioate 4-nitrothiophene-2-sulphonyl chloride and S-ammonium O-ethyl chloromethanephosphonodithioate were reacted by the method of Example 1 to give the desired compound as a brownish oil.

EXAMPLES 11 TO 30

Using the method described in Example 1 or 2 respectively as listed in Table I compounds of the formula:

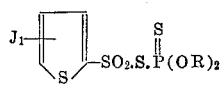

were prepared from the corresponding thiophene-2-sulphonyl chloride bearing a substituent $J_1$ as shown in Table I and a compound of the formula

wherein $M_2$ is the cation used in the example listed and R is as shown in Table I.

TABLE I

| Example: | $J_1$ | R | Method described in Example No. |
|---|---|---|---|
| 11 | H | IsoPr | 1 |
| 12 | 3—CH$_3$ | C$_2$H$_5$ | 1 |
| 13 | H | CH$_3$ | 1 |
| 14 | H | C$_4$H$_7$ | 1 |
| 15 | 5—CH$_3$COO— | C$_2$H$_5$ | 1 |
| 16 | 5—CH$_3$ | C$_2$H$_5$ | 1 |
| 17 | 5—CH$_3$.CO | C$_2$H$_5$ | 1 |
| 18 | 5—Br | C$_2$H$_5$ | 1 |
| 19 | 5—CH$_3$ | CH$_3$ | 1 |
| 20 | 3,4—Br$_2$ | C$_2$H$_5$ | 1 |
| 21 | 4—CH$_3$ | C$_2$H$_5$ | 1 |
| 22 | 5—(n—C$_8$H$_{17}$) | C$_2$H$_5$ | 1 |
| 23 | 5—allyl | C$_2$H$_5$ | 1 |
| 24 | 4,5—Cl$_2$ | C$_2$H$_5$ | 1 |
| 25 | 4(or 5)—SO$_2$.NH.C$_2$H$_5$ | C$_2$H$_5$ | 1 |
| 26 | 4(or 5)—SO$_2$.O.IsoPr | C$_2$H$_5$ | 1 |
| 27 | 5—NO$_2$ | —CH$_3$ | 2 |
| 28 | 5—Cl | C$_2$H$_5$ | 2 |
| 29 | 4—Br | C$_2$H$_5$ | 2 |
| 30 | 5—Cl | IsoPr | 2 |

The products thus obtained were shown by nuclear magnetic resonance, infrared spectroscopy and elemental analysis to be the desired compounds.

EXAMPLES 31 TO 33

Using the method described in Example 1 compounds of the formula:

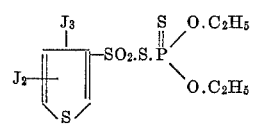

were prepared from the corresponding thiophene-3-sulphonyl chloride, bearing substituents $J_2$ and $J_3$ as shown in Table II, and O,O-diethyl ammonium phosphorodithioate.

TABLE II

| | $J_2$ | $J_3$ |
|---|---|---|
| Example: | | |
| 31 | 5—CH$_3$ | H |
| 32 | 2—CH$_3$ | 5—Cl |
| 33 | 2—CH$_3$ | 5—NO$_2$ |

The products thus obtained were shown by nuclear magnetic resonance, infrared spectroscopy and elemental analysis to be the desired compounds.

The following examples illustrate the biological activity of compounds of the invention against insects, mites, cattle ticks and fungi.

EXAMPLE 34

Formulations of the compounds of the invention were prepared to give a 4% w./v. concentration of active ingredient and these were diluted with tap water to give concentrations of the active ingredient suitable for demonstrating biological activity. The concentrated formulations were prepared as described below.

Those compounds of the invention which are solids at room temperature were ball milled as 4% w./v. suspension in a 0.25% w./v. aqueous solution of Lubrol E (Registered Trade Mark). Lubrol E is a condensation product of alkyl phenol with ethylene oxide.

Those compounds of the invention which are liquids at room temperature were dissolved, by warming if necessary, in a mixture of equal volumes of Lubrol E and Lubrol MOA (Registered Trade Mark). Lubrol MOA is a long chain fatty alcohol/ethylene oxide condensate with a relatively short polyethylene glycol chain. The solution of the compound in the mixture of Lubrol E and Lubrol MOA was then emulsified in water to give a concentration of 4% w./v. of compound and a concentration of the combined weights of Lubrol E and Lubrol MOA of 0.25% w./v.

French bean plants with leaves cut to 1" square were infested with approximately 30 adult mites of *Tetranychus telarius* each. 24 hours after infestation, the leaves of two plants per treatment were sprayed with one or more of the following concentrations of the active compound: 0.005%, 0.01%, 0.025%, 0.05% and 0.1% w./v. 4 days after spraying the live and dead adult mites were counted. If any compound gave a high kill of mites at a given concentration, it was tested further at lower concentrations. The control of mites obtained by these tests is given in Table III as percentage mortality.

TABLE III

| Active ingredient | Percent mortality at percent w./v concentration of active ingredient | | | | | |
|---|---|---|---|---|---|---|
| | Nil | 0.005 | 0.01 | 0.025 | 0.05 | 0.1 |
| (A) O,O-diethyl S-(thiophene-2-sulphonyl) phosphorodithioate | 6 | 86 | 98 | ------- | ------- | 100 |
| (B) O,O-dimethyl S-(5-nitro-thiophene-2-sulphonyl) phosphorodithioate | 6 | ------- | 48 | ------- | 99 | 100 |
| (C) O,O-diethyl S-(5-nitro-thiophene-2-sulphonyl) phosphorodithioate | 6 | ------- | 89 | 95 | 96 | 100 |
| (D) O,O-diethyl S-(4-nitro-thiophene-2-sulphonyl) phosphorodithioate | 6 | ------- | 19 | ------- | 23 | 23 |
| (E) O,O-diethyl S-(4-nitro-thiophene-2-sulphonyl) phosphorodithioate | 6 | ------- | 44 | ------- | 100 | 100 |
| (F) O,O-dimethyl S-(thiophene-2-sulphonyl) phosphorodithioate | 6 | 17 | 48 | ------- | 71 | 100 |
| (G) O,O-dibutyl S-(thiophene-2-sulphonyl) phosphorodithioate | 6 | ------- | 12 | ------- | 50 | ------ |
| (H) OO-diethyl S-(5-chloro-thiophene-2-sulphonyl) phosphorodithioate | 4 | 100 | 100 | ------ | 100 | 100 |

TABLE III—Continued

| Active ingredient | Percent mortality at percent w./v. concentration of active ingredient | | | | | |
|---|---|---|---|---|---|---|
| | Nil | 0.005 | 0.01 | 0.025 | 0.05 | 0.1 |
| (I) O,O-diethyl S-(5-bromo-thiophene-2-sulphonyl) phosphorodithioate | 4 | 90 | 91 | | 96 | 100 |
| (J) O,O-diethyl S-(4-bromo-thiophene-2-sulphonyl) phosphorodithioate | 4 | 84 | 99 | | | 100 |
| (K) O,O-diisopropyl S-(chloro-thiophene-2-sulphonyl) phosphorodithioate | 4 | 29 | | | 91 | |
| (L) O,O-diethyl S-(5-methyl-thiophene-2-sulphonyl) phosphorodithioate | 4 | 100 | 100 | | | |
| (M) O,O-diethyl S-(4-methyl-thiophene-2-sulphonyl) phosphorodithioate | 4 | 96 | 99 | | 100 | |
| (N) O,O-dimethyl S-(5-methyl-thiophene-2-sulphonyl) phosphorodithioate | 4 | 32 | 55 | | | |
| (O) O,O-diethyl S-(5-n-octyl-thiophene-2-sulphonyl) phosphorodithioate | 7 | 85 | | 96 | | 100 |

Where the table shows a dish —, this indicates that no tests were done at the designated concentration of active ingredient. The column designated NIL means that the control spray applied contained water and emulsifiers only and the control mortality given in this column is the highest mortality obtained in the control during parallel testing of the respective compounds.

EXAMPLE 35

The biological effect of several of the compounds, i.e. those designated A, B, C, D and E in Table III of Example 34 on *Calandra granaria* was tested as follows. Sprays were prepared as described in Example 34. Four 4" square glass plates for each treatment were sprayed with 3 ml. each of aqueous preparations containing 0.01, 0.025, 0.05 and 0.1% w./v. of the compounds under test using a Potter tower.

After the plates had dried a polytetrafluoroethylene coated glass ring 1¾" in diameter and 1" deep was placed on each plate; 10 adult *Calandra granaria* were introduced into each ring. A mortality count was done on the 3rd day. This test demonstrated the contact action of the various compounds on *Calandra granaria*. The control attained is given in Table IV as percentage mortality.

TABLE IV

| Active ingredient: | Percent mortality at percent w./v. concentration of active ingredient | | | | |
|---|---|---|---|---|---|
| | Nil | 0.01 | 0.025 | 0.05 | 0.1 |
| A | 4 | 53 | --- | 100 | 100 |
| B | 4 | --- | --- | 11 | 20 |
| C | 4 | --- | 73 | 98 | 100 |
| D | 4 | --- | --- | --- | 12 |
| E | 4 | 0 | --- | 23 | 38 |

The dash "—" and "NIL" have the meanings above stated.

EXAMPLE 36

The biological effect of several of the compounds, namely those designated A, B, C, D and E in Table III of Example 34, on *Plutella maculipennis* was tested as follows.

Sprays were prepared as described in Example 34. Three cabbage plants, three weeks old, were each sprayed to drip point with aqueous preparations containing 0.01, 0.05 and 0.1% w./v. of the compounds under test. The plants were allowed to dry; then lots of 4 leaves from each plant were put into eight separate Petri dishes (2½" in diameter), each of which dishes contained a population of 10 larvae (5 weeks old) of *Plutella maculipennis*. Mortality counts were done on the second day; the control attained is given in Table V as percentage mortality.

TABLE V

| Active ingredient: | Percent mortality at percent w./v. concentration of active ingredient | | | |
|---|---|---|---|---|
| | Nil | 0.01 | 0.05 | 0.1 |
| A | 0 | --- | 25 | 60 |
| B | --- | --- | --- | 15 |
| C | 0 | 10 | 55 | 95 |
| D | --- | --- | --- | 20 |
| E | 0 | 20 | 40 | 65 |

The dash "—" and "NIL" have the meanings above defined.

EXAMPLE 37

The biological effect of several of the compounds, namely those designated A, B, C, D, E, G, H, I, K and M in Table III of Example 34, on *Aphis fabae* was tested as follows. Sprays were prepared as described in Example 34. Broad bean plants which were growing in pots and were 9" tall were infested with approximately 50 *Aphis fabae*. After 24 hours the plants were sprayed on a turntable to drip point with aqueous preparations containing 0.001, 0.005, 0.01, 0.05 and 0.1% w./v. of the compounds under test. The potted plants were then placed upon white paper supported on a board base, and each pot was surrounded on the paper by an 8" diameter circle of Perspex (Registered trademark) which was 1" wide and which had been coated on the inside of the circle with polytetrafluoroethylene. The circle acted as a barrier to prevent the escape of the aphids. After 48 hours the mortality of the aphids was assessed by counting the number which had fallen off the plants on to the paper and comparing this with the combined total of the number of aphids still remaining on the plants and the number of aphids which had fallen off the plants. The control attained is given in Table VI as percentage mortality.

TABLE VI

| Active ingredient: | Percent mortality at percent w./v. concentration of active ingredient | | | | | |
|---|---|---|---|---|---|---|
| | Nil | 0.001 | 0.005 | 0.01 | 0.05 | 0.1 |
| A | 6 | 0 | 90 | 100 | 100 | 100 |
| B | 6 | --- | --- | --- | 30 | 75 |
| C | 6 | 75 | 100 | 100 | 100 | 100 |
| D | 6 | --- | --- | --- | --- | 20 |
| E | 6 | 50 | 100 | 100 | 100 | 100 |
| G | 5 | --- | --- | --- | 50 | 89 |
| H | 5 | --- | --- | 50 | 100 | 100 |
| I | 5 | --- | 25 | 100 | 100 | --- |
| K | 5 | --- | --- | 25 | 100 | --- |
| M | 5 | --- | --- | 10 | 100 | --- |

The dash "—" and "NIL" have the above defined meanings.

EXAMPLE 38

The biological effect of several of the compounds, namely those designated A, B, C, D and E in Table III of Example 34, on adult female and larval cattle ticks, was tested as follows. Using the procedure set down in Example 34 aqueous compositions were prepared containing 0.1 and 1.0% w./v. of the compounds under test. Thirty engorged adult female cattle ticks were treated individually by the micro-syringe technique.

One microdrop (freely falling) from a micro-syringe having a carefully cleaned needle of 0.15 mm. internal bore and 0.4 mm. external diameter was dropped on to the ventral portion of each tick to be treated. After 14 days the mortality count of the adult ticks was assessed by counting the number of eggs laid by them and the percentage hatching of these eggs.

In addition approximately 100 larval ticks were immersed briefly in preparations similar to those described above and a mortality count on the larval ticks was done after 48 hours. The control attained is given in Tables VII and VIII as percentage mortality.

TABLE VII.—CATTLE TICK—ADULTS—MORTALITY AFTER 14 DAYS

| Active ingredient: | Percent mortality of adult ticks at percent w./v. concentration of active ingredient | |
|---|---|---|
| | 0.1 | 1.0 |
| A | 33 | 100 |
| B | 6 | 67 |
| C | 57 | 100 |
| D | 3 | 10 |
| E | 23 | 93 |

TABLE VIII.—CATTLE TICKS—LARVAE—MORTALITY AFTER 48 HOURS

| Active ingredient: | Percent mortality of larval ticks at percent w./v. concentration of active ingredient | |
|---|---|---|
| | 0.1 | 0.1 |
| A | 100 | 100 |
| B | 98 | 100 |
| C | 100 | 100 |
| D | 14 | 27 |
| E | 100 | 100 |

EXAMPLE 39

Emulsions of compounds designated C and E of Table III of Example 34 were prepared by the method set out in Example 34 and were diluted with water and mixed with molten agar to give weight per volume concentrations of the active ingredient of 0.04 2 and 10 p.p.m. in the final product. The prepared agar mixtures were poured over microscope slides. When the mixture had solidified on each slide, the slide was inoculated under a settling tower with spores of the following fungi:

*Sclerotinia fructicola, Alternaria solani, Botrytis allii* and *Venturia inaequlis*. After incubation of the inoculated slides at 25° C. for 24 hours, the percentage germination of the spores was observed. The control obtained is indicated in Table IX by the percentage germination of spores.

TABLE IX

| Active ingredient | Concentration of active ingredient, p.p.m. | Percent germination of spores | | | |
|---|---|---|---|---|---|
| | | S. fructicola | A. solani | B. allii | V. inaequalis |
| Nil | 0.00 | 98 | 99 | 100 | 93 |
| C | 0.04 | 95 | 97 | 100 | 93 |
| | 2.0 | 70 | 65 | 57 | 74 |
| | 10.0 | 2 | 6 | 0 | 5 |
| E | 0.04 | 81 | 98 | 63 | 62 |
| | 2.0 | 17 | 73 | 15 | 4 |
| | 10.0 | 0 | 26 | 0 | 0 |

EXAMPLE 40

Glass tubes 6″ by 2½″ were each stood on several thicknesses of filter paper in a Petri dish, and a piece of cotton wool soaked in a solution of sugar and milk was placed on the filter paper inside each tube. Ten newly-emerged adult houseflies (*Musca domestica*) were placed in each tube, the top of which was sealed with a piece of muslin. The flies were sprayed through the muslin using a spray gun with aqueous emulsions containing 0.05%, 0.01% and 0.005% w./v. of compound H as designated and formulated according to Example 34. Mortality counts were made on the flies after 24 hours; results are listed in Table X.

TABLE X

| Concentration percent w./v. | Percent mortality |
|---|---|
| 0.05 | 100 |
| 0.01 | 100 |
| 0.005 | 85 |

What is claimed is:
1. O,O-diethyl S-(5-nitrothiophene-2-sulphonyl)phosphorodithioate.
2. O,O-diethyl-S-(4-nitrothiophene-2-sulphonyl)phosphorodithioate.
3. O,O-diethyl S-(5-chlorothiophene-2-sulphonyl)phosphorodithioate.
4. O,O-diethyl S-(4-bromothiophene-2-sulphonyl)phosphorodithioate.
5. O,O-diethyl S-(5-bromothiophene-2-sulphonyl)phosphorodithioate.

References Cited

UNITED STATES PATENTS

| 2,585,813 | 2/1952 | McDermott | 252—33 |
| 3,018,215 | 1/1962 | Pianka | 167—22 |
| 3,205,238 | 9/1965 | Godfrey | 260—332.5 |

HENRY R. JILES, Primary Examiner

C. M. SHURKO, Assistant Examiner

U.S. Cl. X.R.

424—202; 260—332.2, 332.3, 332.5